Dec. 27, 1949 J. T. ROSMAN 2,492,816
LOAD-ACTUATED FRICTION BRAKE
Filed May 5, 1947

Inventor
Joseph T. Rosman
By W. S. McDowell
Attorney

Patented Dec. 27, 1949

2,492,816

UNITED STATES PATENT OFFICE 2,492,816

LOAD-ACTUATED FRICTION BRAKE

Joseph T. Rosman, Groveport, Ohio

Application May 5, 1947, Serial No. 746,128

4 Claims. (Cl. 188—77)

This invention relates to brakes and particularly to friction brakes for hoisting drums and other forms of winches.

In the use of the class of equipment to which the brake of this invention is adapted, power is transmitted, usually by a drum and cable, to move a load. With the load still on, a brake is then applied to the transmitting mechanism to hold the load in its raised or stressed position while some other operation is performed. The braking effect is then reduced to allow the transmitting mechanism, either with or without the application of power, to lower the load or otherwise permit the latter to return to released condition.

Many types of brakes have been devised for use with such equipment and have usually comprised a drum and brake band and a linkage system for drawing the band into tight binding engagement with the drum. The most effective of these types have incorporated in them the principle of snubbing the band upon the drum by having the tendency to cause the frictionally engaged band to move with the drum to operate through a force-multiplying leverage, to increase the frictional engagement still further.

I have found this principle to be sound and admirably suited to the requirements, but in former applications of which I am aware many parts requiring fairly close machining tolerances have been necessary. Manufacture, assembly, and maintenance have thus been more expensive than is necessary.

An object of the present invention, therefore, is to provide a brake for winches, and the like, which utilizes the power derived from the force of a load acting through the brake drum itself to operate the brake.

Another object is to provide a force-multiplying mechanism, for such a brake, which is simple in design and operation and which comprises rugged parts which are uncritical as to machining tolerances and economical in manufacture, assembly, and maintenance.

Other objects and advantages will be made apparent by the following description and claims and by the appended drawing.

Figure 1:
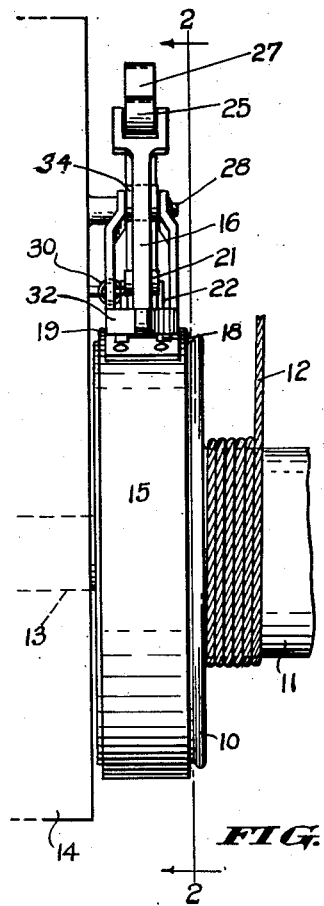
Fig. 1 is an end elevation view of a brake formed in accordance with this invention.

I have illustrated, in the drawings, a preferred embodiment of my invention in which a brake drum 10 is drivingly secured to a winding drum 11. A hoisting cable 12 is wound upon the drum and supports a load, not shown, and the two drums are mounted on a shaft 13 rotatably carried by a frame 14.

Figure 2:
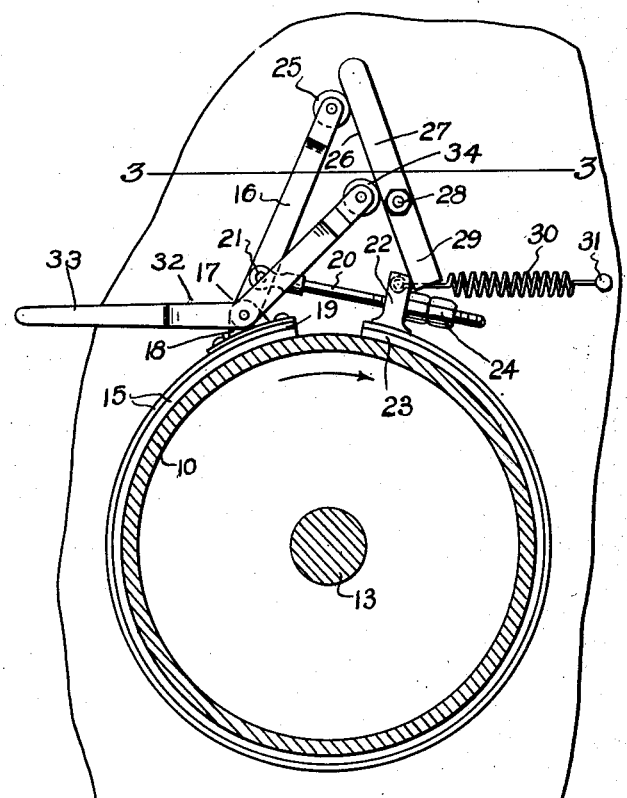
Fig. 2 is a transverse vertical sectional view taken along a plane indicated by the line 2—2 of Fig. 1.
Figure 3:
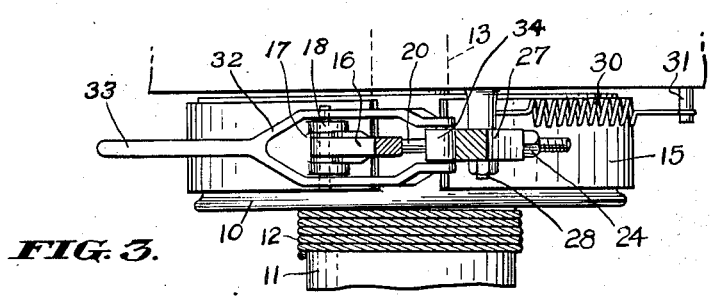
Fig. 3 is a horizontal sectional view taken along the line 3—3 of Fig. 2.

A brake band 15 encircles the brake drum in the usual manner and is adapted to be clamped tightly thereon by my novel form of operating mechanism. A lever 16 is pivotally connected, as at 17, to suitable ears 18 carried by one end 19 of the band. A link or tie rod 20 is pinned at 21 to the lever and passes freely through a lug or block 22 carried by the other end 23 of the band. The effective length of the link 20 may be adjusted, to compensate for wear of the band, by means of the nuts 24 which bear against the block. The arrangement is such that when the lever 16 is swung toward the left, in Fig. 2, the ends 19 and 23 of the band are urged together to effect a braking action upon the drum 10.

The parts described will be recognized by one skilled in the art to be a usual means of tightening the band. My invention lies in the novel device for effecting the operation of the lever consequent upon a slight movement of the band with the drum.

The lever 16 carries a roller or cam follower 25 at its free end, the roller being adapted to roll along a surface 26 of a lever 27 which is pivoted, as at 28, to the frame. The opposite arm 29 of the lever engages the block 22. A lever of the first class is thus obtained, with a fulcrum at 28, and a slight movement of the arm 29, due to a correspondingly light movement of the end 23 of the band, is enlarged by the ratio of arm lengths, and relative angular positions of levers 16 and 27, to a greater movement of the cam follower and lever 16.

The band tends to rotate with the drum since the tie rod 20 is so adjusted that there is at all times, a slight drag of the brake lining. In winding the cable upon the drum 11, to lift the load, the rotation is counter-clockwise, as viewed in Fig. 2. The end 23 moves with the drum 10, against a resilient restraint which preferably, is imposed by a tension spring 30 tying the block 22 to an anchorage 31 on the frame. This slight movement allows a greater movement of the end 19 since there is not only an equal amount, as permitted by the line 20, but also an additional amount due to a clockwise rotation of the lever or cam 27 which allows the lever 16 to assume a more inclined position. The net result is an increase in diameter of the brake band sufficient to free the drum for easy winding operation of the winch.

When the winding stops, the load, of course, tends to unwind the cable in a forcible manner. The brake, however, immediately comes into play to stop the unwinding. A snubbing action is effected since, with rotation in the direction of the arrow, the end 23 of the band is urged with greater force than is the end 19 and a tightening of the band results.

The differential movement of the two ends is caused by a rocking of the lever 27 by the block 22. This rocking forces the roller 25 to the left. Thus the end 19 not only is caused to follow the end 23 by the link 29, but is also forcibly advanced due to the large ratio of the arm lengths of lever 16. The more the drum attempts to rotate with the load, the greater the locking action which is produced.

It will be understood that, while movements to and fro have been described, in actuality they are nearly imperceptible. The locking and unlocking actions take place as an interplay of forces rather than as large-scale movements. This I consider to be an advantageous feature of my device inasmuch as the load is held immediately at any desired position without slippage.

Provision is made for the release of the brake through a manually operable bifurcated bell crank lever 32 which is fulcrumed to the outer surface of the ears 18; and which is formed at one end with a handle portion 33 extending outwardly from the mechanism, and at its opposite end with a roller or cam follower 34. The latter is positioned so as to engage the inner face of the lever 27 slightly above its fulcrum 28. In normal braking action, the roller 34 will ride freely upon the lever during its rocking movement, and when release of the brake is desired, the handle portion of the bell crank lever 32 is lifted or raised, whereupon the roller 34 is forced downwardly upon the lever 27 to the horizontal plane of the fulcrum 28. When so doing, a crowding action will be effected tending to increase the effective length of the bell crank lever between the fulcrum 28 of the lever 27 and the fulcrum point of the bell crank lever 32. As the lever 27 is supported by a stationary pivot, the end 19 of the brake band will be forced in a spreading action to effect an expansion thereof, and a consequent release of the brake. By this latter system, the release of the frictional drag of the brake may be graduated by the force applied to the handle 33, and the drum may be allowed to unwind under action of the load at substantially any speed. While the above release mechanism has been disclosed as a preferred form, it will be understood that various systems may be coupled with the present brake to effectively release the same, for example by applying linkage to the upper end of the lever 27, which is capable of exerting a clockwise rocking movement to the lever, the release of the brake system may be effected in the manner corresponding to its release upon counter-clockwise movement of the drum. It will also be understood that remote controlled linkage may be connected with the outer end of the bell crank lever 32 to impart the necessary releasing force to the same without departing from the spirit of the invention.

It will be noted that all of the parts may be made as heavy and as rugged as desired and that none of them require a high degree of dimensional accuracy or machining. Any variation in dimensions can easily be compensated for by the adjustment of the nuts 24.

While I have illustrated a preferred embodiment of my brake mechanism it will be apparent that numerous changes as to details of construction can be made without departing from the spirit and scope of the invention.

I claim:

1. A friction brake of the character described comprising a brake drum, a split brake band encircling said drum, a lever pivotally connected with one end of said band, a link pivotally connected with said lever intermediate the ends thereof and joining the latter with the opposite end of said band, said link serving as a fulcrum for said lever, and means responsive to the movement of the opposite end of the band for imparting rocking movement to said lever, said means comprising a second lever engageable with said first named lever and the opposite end of said band.

2. A load-actuated friction brake comprising a frame, a rotatable brake drum disposed adjacent to said frame, a split brake band concentric with said drum, a lever pivotally secured at one of its ends to one end of said brake band, a link joining the opposite end of said brake band with the intermediate portion of said lever, said link serving as a fulcrum for said lever, and a second lever pivotally mounted intermediate its ends on said frame and having one of its ends engageable with the said opposite end of said brake band and its other end in engagement with the outer end of said first-named lever, said second lever serving upon movement of the said opposite end of said brake band to impart a rocking movement to said first-named lever.

3. A friction brake comprising a stationary frame, a rotatable brake drum disposed adjacent to said frame, a split-type brake band encircling said drum, a first lever pivotally secured at one of its ends to one end of said band, a lug secured to the opposite end of said band, a link pivotally secured at one of its ends to the intermediate portion of said lever and slidably connected at its opposite end with said lug, and a second lever pivotally supported intermediate its ends by said frame and having one of its ends in abutting engagement with said lug and its opposite end in engagement with the outer end of said first lever, said second lever being movable in response to the movement of said lug to impart rocking movement to said first lever.

4. A load-actuated friction brake comprising a frame, a rotatable brake drum disposed adjacent to said frame, a split brake band concentric with said drum and having relatively separable ends, a first lever pivotally connected at one of its ends to one end of said band, an outwardly projecting lug carried by the opposite end of said band, a link pivotally connected at one of its ends to the intermediate portion of said first lever and slidably connected at its opposite end with said lug, spring means carried by said frame and connected with said lug to urge separation of the ends of said band, a second lever pivoted intermediate its ends to said frame and engageable at one of its ends with said lug and at its opposite end with the outer end of said first lever, said second lever being movable in response to the movement of said lug to impart rocking movement to said first lever, and a third manually operable lever extending between the first-named end of said brake band and the intermediate portion of said second lever and operable to release said brake independently of the movement of said first and second levers.

JOSEPH T. ROSMAN.

REFERENCES CITED

The following references are of record in the file of this patent:

UNITED STATES PATENTS

| Number | Name | Date |
|---|---|---|
| 958,446 | Vanderbeek | May 17, 1910 |
| 1,808,770 | Edwards | June 9, 1931 |
| 1,752,618 | Smith | Apr. 1, 1930 |
| 1,946,892 | Benson | Feb. 13, 1934 |

FOREIGN PATENTS

| Number | Country | Date |
|---|---|---|
| 151,420 | Germany | Aug. 14, 1903 |
| 469,802 | Germany | July 21, 1927 |